(12) United States Patent
Champion et al.

(10) Patent No.: US 7,295,882 B2
(45) Date of Patent: Nov. 13, 2007

(54) METHOD AND APPARATUS FOR AUDIBLE ERROR CODE DETECTION AND IDENTIFICATION

(75) Inventors: David Frederick Champion, Durham, NC (US); Daniel Paul Kelaher, Holly Springs, NC (US); Bradley Michael Lawrence, Durham, NC (US); Timothy Andreas Meserth, Durham, NC (US); David Todd Nay, Raleigh, NC (US); Kevin Laverne Schultz, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 910 days.

(21) Appl. No.: 10/185,808

(22) Filed: Jun. 27, 2002

(65) Prior Publication Data

US 2004/0002782 A1    Jan. 1, 2004

(51) Int. Cl.
  *G06F 17/00*    (2006.01)
(52) U.S. Cl. ..................................... 700/94
(58) Field of Classification Search ................. 700/94; 714/100, 1, 5, 7, 9; 704/235; 340/825.19, 340/692, 566; 715/501.1; 397/197–199; 381/59, 58, 86
See application file for complete search history.

(56) References Cited

U.S. PATENT DOCUMENTS

| | | | | |
|---|---|---|---|---|
| 5,615,331 | A | 3/1997 | Toorians et al. | 395/182.07 |
| 5,646,535 | A | 7/1997 | Dornier | 324/556 |
| 5,651,070 | A * | 7/1997 | Blunt | 381/56 |
| 5,790,050 | A * | 8/1998 | Parker | 340/902 |
| 5,999,089 | A * | 12/1999 | Carlson | 340/328 |
| 6,035,355 | A | 3/2000 | Kelley et al. | 710/101 |
| 6,145,021 | A | 11/2000 | Dawson, III et al. | 710/8 |
| 6,192,490 | B1 | 2/2001 | Gross | 714/47 |
| 6,279,125 | B1 | 8/2001 | Klein | 714/38 |
| 2002/0142269 | A1* | 10/2002 | Harriman | 434/118 |

FOREIGN PATENT DOCUMENTS

| | | |
|---|---|---|
| JP | 55028149 | 2/1980 |
| JP | 4155498 | 5/1992 |

OTHER PUBLICATIONS

Wikipedia.com article describing a Computer BIOS.*
BIOS Central, Diagnostics-Index for symptoms, messages, error, codes or beeps, AMI BIOS Beep Codes, AST BIOS Beep Codes, Award BIOS Beep Codes, Compaq BIOS Beep Codes, IBM BIOS Beep Codes, Mylex BIOS Beep Codes, Phoenix BIOS Beep Codes, www.bioscentral.com, retrieved May 2, 2002.

(Continued)

*Primary Examiner*—Sinh Tran
*Assistant Examiner*—Andrew C Flanders
(74) *Attorney, Agent, or Firm*—Kunzler & McKenzie

(57) ABSTRACT

The invention describes a method and apparatus for audible error code detection and identification. The method and apparatus allow an operator, user, or customer to automatically identify an error condition within an electronic device, such as a workstation computer or network server. The apparatus is configured to output an error message without the need for paper or electronic copies of manufacturer error code lookup tables, except as contained within the apparatus itself, thus simplifying the error detection and identification process. Additionally, the method and apparatus allow an operator to select various output modes so that the apparatus may report either a representation of the generated error code or a representation of the corresponding error condition.

23 Claims, 5 Drawing Sheets

OTHER PUBLICATIONS

Translating Personal Computer Beeps into Spoken Messages, Research Disclosure, Apr. 1993, No. 348.

Register for and Process Alarms to Alerts, IBM Technical Disclosure Bulletin, vol. 37, No. 09, Sep. 1994.

* cited by examiner

METHOD AND APPARATUS FOR AUDIBLE ERROR CODE DETECTION AND IDENTIFICATION

BACKGROUND OF THE INVENTION

1. The Field of the Invention

The invention relates to the field of error indication systems associated with computerized devices, and more particularly to automated detection and identification of audible error codes.

2. The Relevant Art

Many types of computer and other electronic systems generate audible error codes in response to specific faults and error conditions. These error codes are often invoked via a BIOS system and typically consist of simple combinations of audible tones of varying duration. For example, one long tone followed by two short tones might indicate a disk adapter error on a particular device, while the same tone sequence from another device might indicate a video vertical retrace error.

Typically, current methods for identifying error conditions that correspond to the audible codes require referencing a lookup table provided by the device manufacturer. For example, an error code lookup table may be available within documentation provided by the manufacturer in either hard copy form, such as printed manuals, or soft copy form, such as CD-ROM files or Internet web pages.

Several problems exist that are related to current methods for detecting and identifying error conditions within computers and other electronic equipment. One problem relates to the environments in which electronic equipment is typically used. Often, electronic equipment is used in an environment where the ambient noise level makes discernment of audible error codes difficult. For example, ambient noise levels may be affected by human conversations, noise from heating and ventilation systems, mechanical equipment emissions, or similar sources found within the diverse environments where electronic equipment is used.

Another problem associated with current error code discernment and identification methods is the availability of documentation. Although documentation may be available over the Internet or included in hard copy manuals, the lookup tables are frequently misplaced or otherwise unavailable at the particular time an audible error code is generated. When documentation is not readily available, equipment downtime may result in business setbacks including, but not limited to, financial losses, production stoppage, decreased personnel productivity, and the like.

In addition to potential noise and documentation problems, audible transmission of error codes does not allow hearing-impaired service technicians and customers to identify error conditions and perform maintenance on malfunctioning machines. The number of audible error codes a system can use is also limited, in that current systems typically require human perception, retention, and identification of the particular emitted error codes generated in response to an error condition.

Given the difficulty of the present situation within currently available electronic systems, many possible solutions have been explored. However, prior art solutions typically require modification of the hardware and/or firmware of the electronic device or system. Such modifications require select knowledge of each manufacturer's equipment. Furthermore, the prior art solutions do not fully resolve the problems of noise, documentation, and accessibility described above.

As mentioned previously, many prior art solutions require modification of the system hardware. Implementation of such prior art error code indication devices, such as diagnostic cards, LED indicators, and similar products, require inclusion of specialized circuitry or physical insertion of a device within the error-generating electronic equipment. Additionally, the implementation requires reconfiguration of the system to recognize and provide proper functionality of the new device. The cost of labor and materials per monitored device is prohibitive.

Therefore, what is needed is a method and apparatus capable of identifying specific error conditions through detection and processing of audible error codes. Such a method and apparatus preferably would be independent of the hardware and software of the electronic equipment producing the error code. Additionally, the method and apparatus would be capable of detecting and discerning audible codes within noisy environments. Optimally, the solution would implement automated documentation referencing at the time an error code is generated and provide a means for conversion of the detected error code to a discernable message for use by a service technician or customer, regardless of possible hearing impairment.

BRIEF SUMMARY OF THE INVENTION

The present invention has been developed in response to the present state of the art, and in particular, in response to the problems and needs in the art that have not yet been fully solved by currently available error code detection and identification means and methods. Accordingly, it is an overall object of the present invention to provide an audible error code detection and identification apparatus and method that overcome many or all of the above-discussed shortcomings in the art.

To achieve the foregoing object, and in accordance with the invention as embodied and broadly described herein in the preferred embodiments, an audible error code detection and identification apparatus is provided and is configured to detect audible error codes, such as those generated by electronic equipment, and output an identified error message to an operator.

The audible error code detection and identification apparatus is provided with a logic unit containing a plurality of modules configured to carry out the individual steps of the detection and identification process. These modules in the described embodiments include an input module, a signal detection module, a signal conversion module, a signal comparison module, an output module, and an error message lookup module.

In one embodiment of the present invention, an audible error code detection and identification apparatus is capable of receiving and processing an audible error code generated by an electronic device. The detection and identification apparatus is configured to convert an audible error code to a set of signal detection parameters and to compare the signal detection parameters with values within an error code signature table to provide an error code index. The error code index is then used to access an error message lookup table and retrieve message parameters from which an error message is constructed and communicated to the service technician or equipment operator.

The error code signature table and the error message lookup table are typically stored within a non-volatile memory such as a flashable ROM. In order to allow for error codes of new machines or error code updates for existing machines, the detection and identification apparatus may include a communications port for receiving revised or new lookup tables. Additionally, the apparatus may include input selector buttons that are used to navigate through setup menus and device configuration settings, such as language, output mode, receive mode, or other typical setup options pertaining to the use of the apparatus.

In one embodiment, the input selector buttons are also used to scroll through a list of manufacturers and models. The chosen make and model of equipment determines the error code signature table containing ideal values with which the signal detection parameters are compared. Once an error code comparison yields a match, a corresponding error code index is used to access an error message lookup table. The retrieved error message is then output to an operator. The operator may be a service technician, customer, or other party interested in the electronic device error.

The error message of the detected and identified error condition is preferably conveyed through a visual and/or an audible means that reports the identified error condition corresponding to the received audible error code. In the simplest form, the apparatus receives an audible code comprising a tone sequence, converts the audible code to a digital signal, and outputs a visual signal via an LED that mimics the tone sequence in signal on/off states and duration.

In a more detailed embodiment, the detection and identification apparatus converts the received audible error code signal to a set of signal detection parameters, compares the signal detection parameters to a set of known error code signatures, references an error message lookup table for a corresponding error message, and outputs the error message to an operator via a LCD, or similar display. Optionally, instructions and information related to the identified error condition and required maintenance are also displayed.

A method of the present invention is also presented for detecting and identifying an audible error code. The method is initiated with the selection of apparatus settings, including make and model of the electronic test equipment.

Upon selection of the apparatus settings and receipt of an audible error code, the signal detection module receives and converts the audible error code to a set of signal detection parameters. The detection and receipt of the audible error code, in one embodiment, includes means to filter out unrelated ambient or equipment noise so as to enhance the detection capability of the device. The signal detection parameters resulting from the conversion of the audible error code are then compared with values from an error code signature table in order to determine an error code index. In one embodiment, the error code signature table contains error code signatures that exclusively correspond to the electronic device indicated during selection of the apparatus settings.

The identified error code index is used to select the appropriate error message from a table of error messages. In response to selection, the appropriate error message is output via an output indicator that conveys a representation of the identified error condition to an operator who is capable of using that information.

The method and apparatus as described above provide for a more practical, independent, and cost effective process through which audible error codes are detected and identified. The apparatus has advantages over prior art in that it may be a stand-alone device that does not depend on connection to the hardware or update of the firmware of the electronic device. Moreover, the apparatus offers flexibility within the dynamic market of computers and electronic devices—the memory allows for storage of revised lookup tables for modified or soon-to-be-released equipment.

In addition to the flexibility offered by the lookup table updates, the local storage of such tables provides increased convenience, and consequently lower user cost, than present methods of searching for paper or electronic copies of the lookup table documentation.

Finally, the method and apparatus of the present invention allow for a greater variety of operators and users through the implementation of communications methods that provide means to convey the necessary information to a hearing-impaired operator. These and other objects, features, and advantages of the present invention will become more fully apparent from the following description and appended claims, or may be learned by the practice of the invention as set forth hereinafter.

BRIEF DESCRIPTION OF THE DRAWINGS

In order that the manner in which the advantages and objects of the invention are obtained will be readily understood, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions that may, for instance, be organized as an object, procedure, or function. Nevertheless, the executables of an identified module need not be physically located together, and may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Various electronic signals are also discussed within this specification. Because those signals are transient, they are not independently depicted within the Figures. Rather, the signals are given a number corresponding to the communication mediums over which the signals are transmitted.

Figure 1:
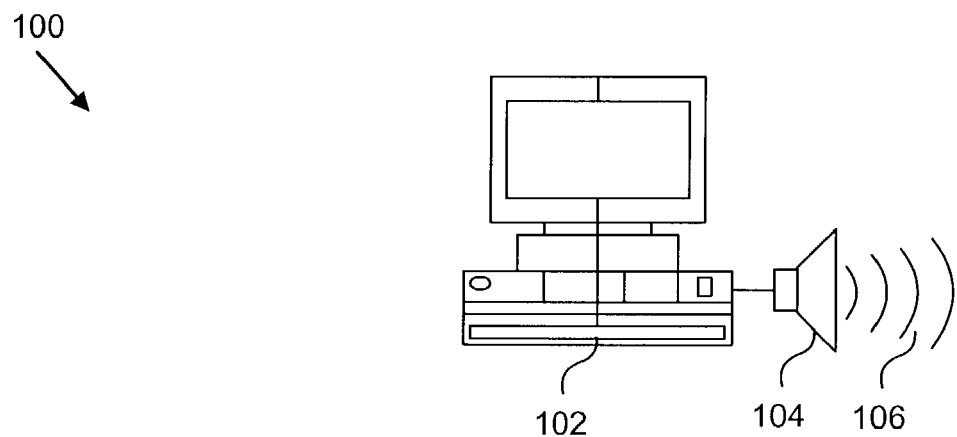
FIG. 1 is a schematic front view illustration of a representative electronic device capable of generating an audible error code in accordance with the prior art.

FIG. 1 is a schematic block diagram illustrating one embodiment of a representative prior art audible error code generation system 100. The system 100 includes an electronic device 102 that represents a network server, computer workstation, or other electronic device with the capability of recognizing internal errors and providing notification of such errors to a user.

The system 100 also includes an audible error code generator 104, such as an electronic speaker, that 1) converts the internally processed error code to an audible error code 106, and 2) transmits the audible error code 106 to an operator, user, or customer. Under prior art conditions, the operator identifies the audible error code 106 by manually searching a lookup table supplied by the electronic device 102 equipment manufacturer for a matching error code and corresponding error condition.

Figure 2:
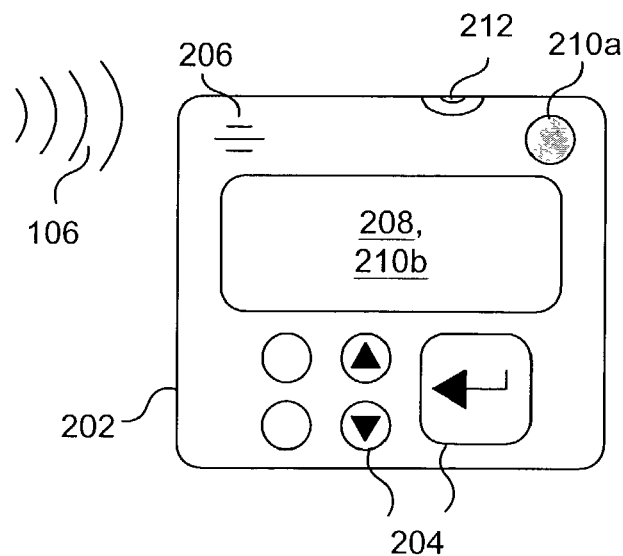
FIG. 2 is a schematic front view illustration of one embodiment of a representative audible error code detection and identification apparatus in accordance with the present invention.

FIG. 2 shows one embodiment of a representative audible error code detection and identification apparatus 202 of the present invention. The depicted embodiment of the apparatus 202 includes input selectors 204, an audible error code receiver 206, a user interface screen 208, an output indicator 210a, and a communications port 212. In certain embodiments, the user interface screen 208 may also be used as an output indicator 210b.

The input selectors 204 are used to make initial setup configuration selections and scroll through equipment type and error code lists displayed on the user interface screen 208. Configuration and equipment settings that a user might select include user language, output type, equipment manufacturer and model, lookup table install, lookup table update, and other information incidental to the proper operation of the audible error code detection and identification device 202.

In the depicted embodiment, the audible error code receiver 206 is a microphone port through which an audible error code 106 generated by the electronic device 102 is received as input to the detection and identification apparatus 202. In response to reception and processing of the audible error code 106, an identified error condition corresponding to the generated error code 106 is output to an operator via an onboard output indicator 210. The output indicators 210a and 210b may also serve as a translation device for the generated audible error code 106 by producing a visual communications signal that mimics and identifies the actual generated error code 106.

For example, an electronic device 102 might produce an audible error code 106 that distinctly consists of one long and two short tones. An audible error code detection and identification device 202 placed near the electronic device 102 receives the generated error code 106 via the receiver 206 and internally processes the generated error code 106. Subsequently, in one embodiment, the detection and identification apparatus 202 transmits a visual output signal that consists of one long and two short visual bursts to an operator. The visual output signal mimics the generated audible error code 106 in signal quantity and duration.

An output indicator 210 may be a device that produces a visual and/or audible interpretation of the identified error condition. The output indicator 210 may also consist of a combination of separate indicating devices that provide distinct means of communication, such as visual text, visual light, audible tone, or audible voice, to an operator. A specific embodiment may include a combination of output indicators 210 such as a user interface screen 210b and a light-emitting diode (LED) 210a, as shown in the embodiment of FIG. 2.

Certain embodiments of the audible error code detection and identification apparatus 202 include a communications port 212 configured to communicate with a separate electronic device. Communication with a separate electronic device, such as a computer workstation or laptop computer, is conducted in order to, for example, receive new or updated lookup tables corresponding to the electronic device 102, or to facilitate a more advanced user interface with the detection and identification apparatus 202. A more advanced user interface might include the capability of providing real-time maintenance and equipment troubleshooting hyperlinks for an output error message.

Figure 3:
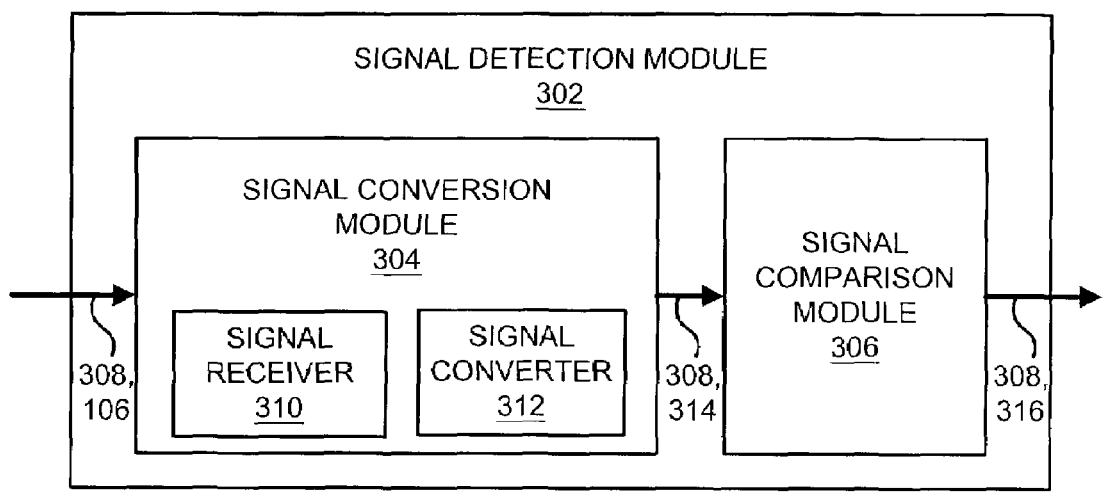
FIG. 3 is a schematic block diagram illustrating one embodiment of a signal detection module in accordance with the present invention.

FIG. 3 is a schematic depiction of a specific embodiment of the signal detection module 302. As shown, the signal detection module 302 includes a signal conversion module 304, a signal comparison module 306, and communications channels 308, such as a memory bus, that provide a physical connection and electronic signal path of travel between the individual components.

The depicted signal conversion module 304 has two components. A signal receiver 310 detects and receives the audible error code 106 generated by the electronic device 102. Subsequently, a signal converter 312 converts the received audible error code 106 to a set of signal detection parameters 314 which are transmitted over the communications channels 308 to the signal comparison module 306.

After the audible error code 106 has been converted into the signal detection parameters 314, the signal comparison module 306 compares the signal detection parameters 314 with a set of error code signatures. The error code signatures are stored within an error code signature lookup table 510, to be discussed further in conjunction with FIG. 5. The error code signatures, in one embodiment, are ideal values for the signal detection parameters that correspond to each audible error code that may be generated by the electronic device 102. Upon locating the error code signature that matches the signal detection parameters 314 extracted from the audible error code 106, the signal comparison module 306 outputs an associated error code index 316.

In an alternate embodiment, the signal comparison module 306 compares the signal detection parameters with values from an error code signature lookup table 510 stored in a separate electronic device and accessed through the electronic connection permitted by the communications port 212. In either case, the final output of the signal detection module is the error code index 316 resulting from the error code signature search.

Figure 4:
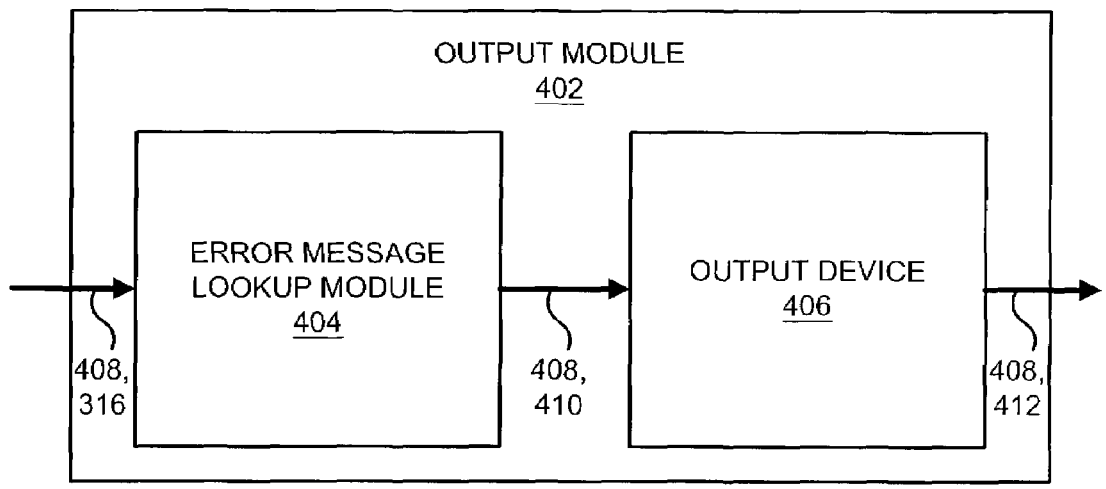
FIG. 4 is a schematic block diagram illustrating one embodiment of an output module in accordance with the present invention.

FIG. 4 illustrates one embodiment of an output module 402 in accordance with the present invention. In the illustrated embodiment, the output module 402 includes an error message lookup module 404 and an output device 406. The internal components are connected by communications channels 408 that are substantially similar to the communications channels 308.

The error message lookup module 404 receives the error code index 316 supplied by the signal detection module 302. The error code index 316 is then used to access an error message lookup table 512, which is discussed below. The error message lookup module 404 sends a signal containing error message parameters 410 to the output device 406. The error message parameters 410 may take the form of audio file and volume designators in one embodiment, or text file designator in another embodiment, or any other appropriate designators to convey the error message parameters 410 to the output device 406.

The output device 406 converts the error message parameters 410 to an error message 412 in a form that is discernable by an operator or customer. As mentioned above, the discernable error message 412 may take the form of a visual text message, an audible voice message, or any other communications form as generated by the detection and identification apparatus 202.

Figure 5:
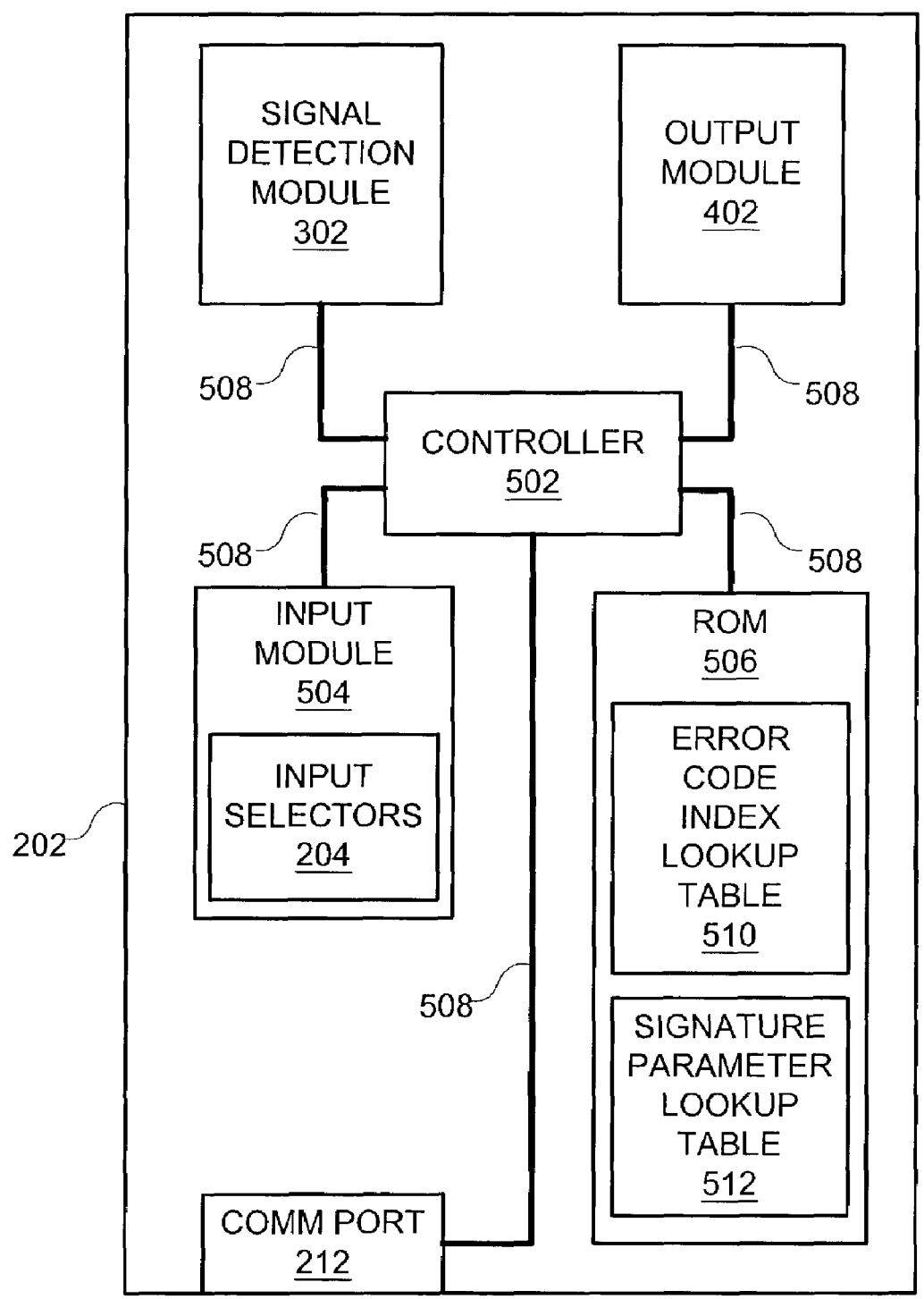
FIG. 5 is a schematic block diagram illustrating one embodiment of a representative audible error code detection and identification apparatus in accordance with the present invention.

FIG. 5 depicts an audible error code detection and identification apparatus 202. In contrast to FIG. 2, FIG. 5 describes the internal components and modules that make up one embodiment of the detection and identification apparatus 202. These components include a controller 502, a signal detection module 302, an input module 504, an output module 402, a read-only memory (ROM) chip 506, a communications port 212, and the various communications channels 508 interconnecting the components. These communications channels 508 are preferably substantially similar to the communications channels 308.

The controller 502 preferably contains all of the necessary control instructions to perform the functions of the audible error code detection and identification apparatus 202 as described herein. The signal detection module 302, in essence, detects and receives the audible error code 106 and subsequently converts it from an audible error code 106 to the error code index 316, as provided in the description of FIG. 3.

The input module 304 serves as an interface between the input selectors 204, user interface screen 208, and the controller 502. In a similar manner, the output module 308 serves as an interface between the controller 502 and the output device 406, the details of which have been presented in conjunction with the discussion of FIG. 4. As described previously, the output device 406 may include a combination of visual and audible signaling devices, such as a user interface screen 210b and a light-emitting diode (LED) 210a, as depicted in FIG. 2.

The ROM chip 406 includes memory capacity for a plurality of lookup tables, namely an error code signature lookup table 510 and an error message lookup table 512.

Each pair of online lookup tables 510 and 512 coincides with a specific make and model of the electronic device 102 and may be updated as required to include new or revised lookup tables 510 and 512 as required by the operator, user, or customer. Such upload of new or revised information is possible due to the flashable properties of the ROM chip 406 and the data transfer via the communications port 212.

Figure 6:
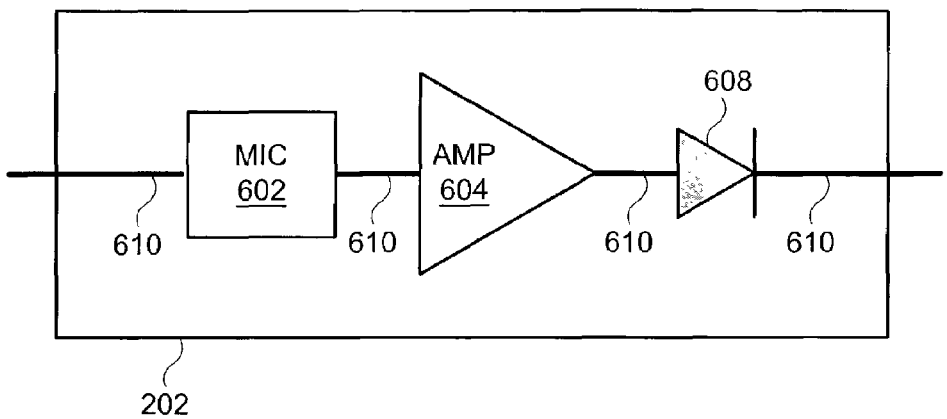
FIG. 6 is a schematic block diagram illustrating one embodiment of a representative audible error code detection and identification apparatus in accordance with the present invention.

FIG. 6 illustrates one embodiment of the audible error code detection and identification apparatus 202 that is configured to output a visible signal that mimics the tone status and duration of an audible error code 106. Essentially, the device 202 consists of a microphone 602, a signal amplifier 604, a LED output indicator 606, and interconnecting communications channels 608.

In this example, the microphone 602 receives the generated audible error code 106 and converts it to signal detection parameters 312. The amplifier 604 receives the signal detection parameters 316 and outputs a signal containing error message parameters 410 to the LED output indicator 606, which conveys a visual representation of the error message 412 to an operator.

Figure 7:
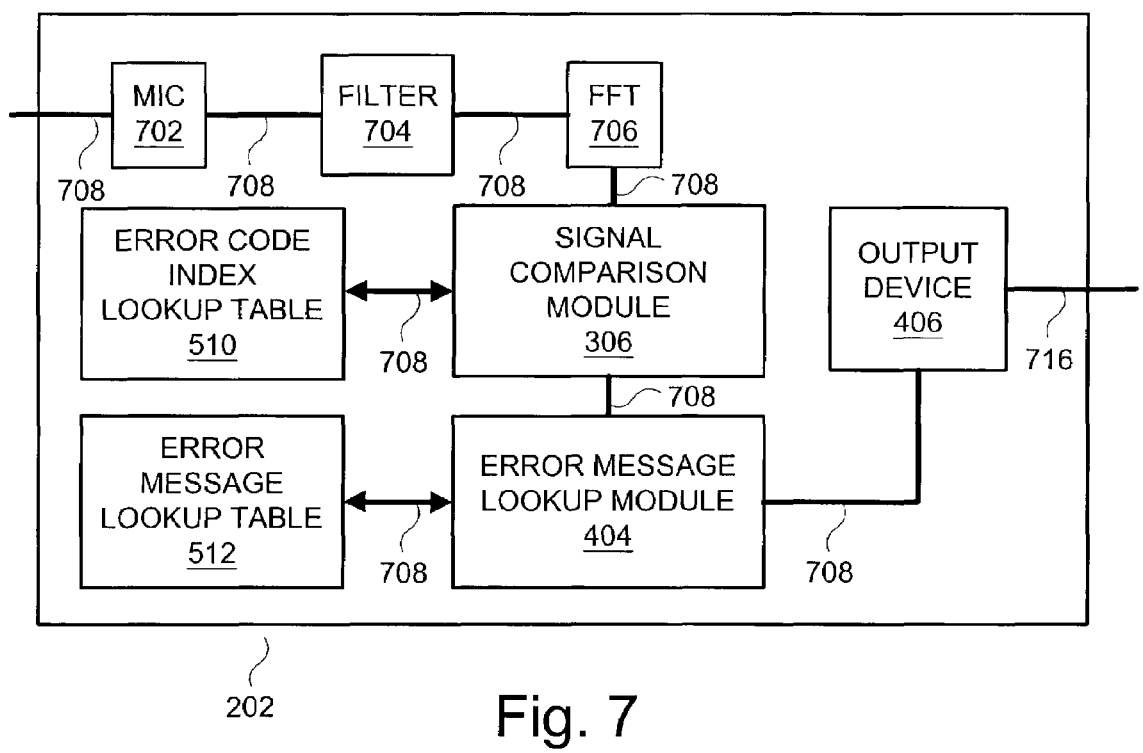
FIG. 7 is a schematic block diagram illustrating one embodiment of a representative audible error code detection and identification apparatus in accordance with the present invention.

FIG. 7 illustrates a further embodiment of an audible error code detection and identification apparatus 202. The depicted embodiment includes a microphone 702 capable of receiving the audible error code 106 and providing a microphone output signal. In certain embodiments, an analog-to-digital converter 704 converts the audio signal 712 to a digital signal 714. The analog-to-digital converter 704 output signal 714 is passed through a filter 706 and is then transmitted to a fast fourier transform (FFT) module 708 that serves as a signal converter 312 and generates spectral signal detection parameters 314a. The filter 706 may be a noise cancellation filter capable of adaptively isolating the features of the audible error code 106 from noise. In general, these components make up the signal conversion module 304.

The spectral signal detection parameters 314a travel via the communications channels 710, which are substantially similar to the communications channels 308, to the signal comparison module 306. The signal comparison module 306 uses the signal detection parameters 314a to search the error code signature table 510 and output the corresponding error code index 316a, as described above.

Similarly, the error code index 316a is used by the error message lookup module 404 to select the correct error message parameters 410a within the error message lookup table 512. The error message parameters 410a are then used by the output device 406 to create an appropriate output to convey the error message 412a to the operator.

Figure 8:
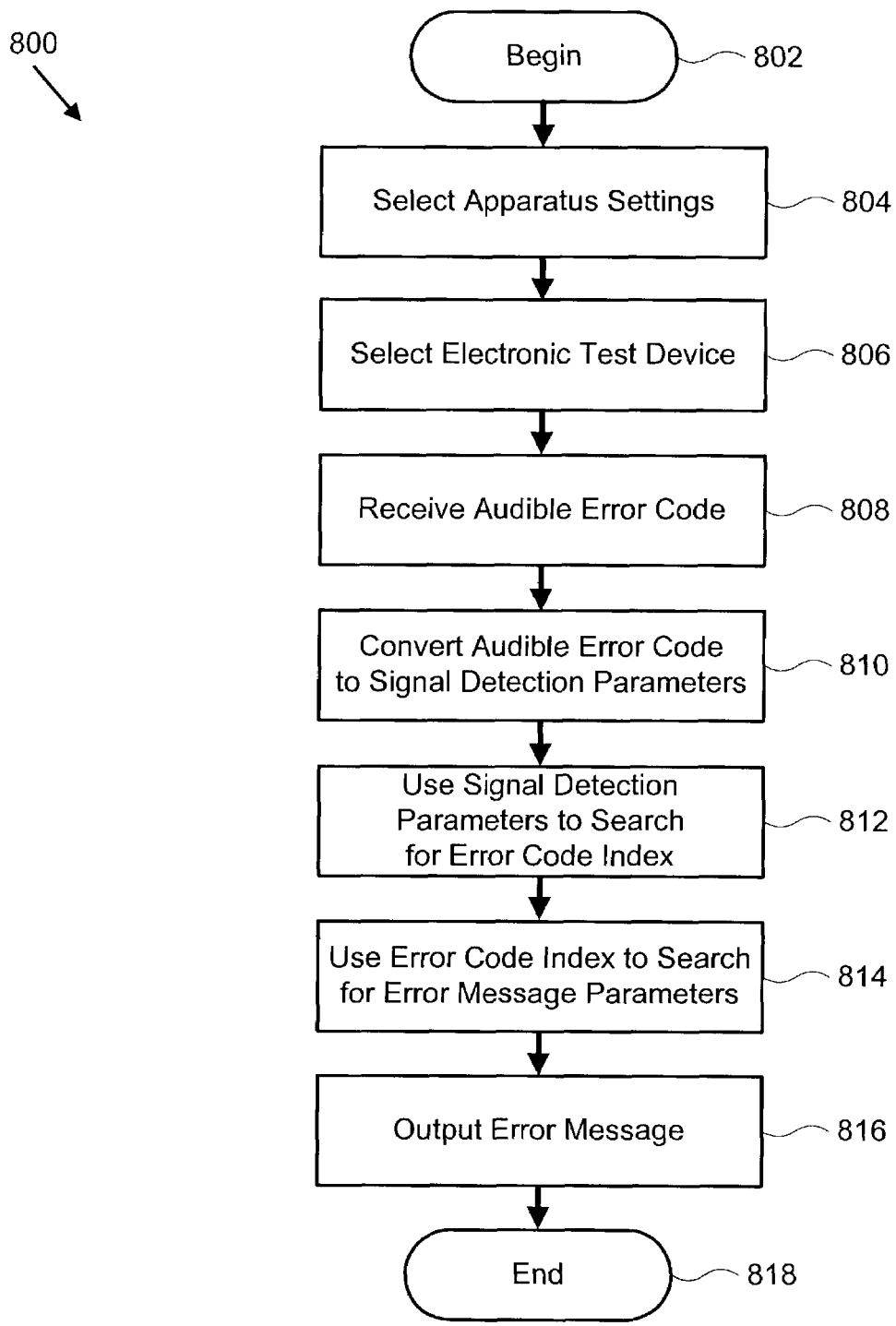
FIG. 8 is a schematic flow chart diagram illustrating one embodiment of an audible error code detection and identification method of the present invention.

FIG. 8 depicts a method of audible error code detection and identification 800 in accordance with one embodiment of the present invention. The method 800 may be conducted in conjunction with or independent from the audible error code detection and identification apparatus 202.

The method begins 802 followed by selecting 804 various configuration settings, such as language and output modes, and selecting 806 an electronic device manufacturer and model. This information allows the signal comparison module 306 and output module 402 to access the correct lookup tables 510 and 512, respectively, that match the electronic device 102. In one embodiment, selecting 804 and selecting 806 occur via the input selectors 204 and input module 504.

The audible error code detection and identification method 800 proceeds by receiving 808 and converting 810 the audible error code 106 to the signal detection parameters 314. The signal detection parameters 314 are subsequently used in searching 812 the error code signature table 510 in order to locate the corresponding error code index 316.

In response to locating the error code index 316, the error code index 316 is used in retrieving 814 within the error message lookup table 512 the error message parameters 410 to send to the output device 406. The output device 406 receives the error message parameters 410 and proceeds by converting 816 the error message parameters 410 to a representation of the error message 412 and communicating 818 the error message 412 to the operator. After communicating 818 the error message 412, the audible error code detection and identification method 800 terminates 820.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for detection and identification of an audible error code, the apparatus comprising:
    a signal detection module configured to detect and receive the audible error code when audibly communicated from an electronic device, wherein the signal detection module is not in electrical communication with the electronic device; and
    an output module configured to convey an error message corresponding to the audible error code to an operator, the error message comprising an audible voice and visual text providing real-time maintenance and equipment troubleshooting hyperlinks.

2. The apparatus of claim 1, further comprising a signal conversion module configured to convert the received audible error code to a set of signal detection parameters using a fast Fourier transform.

3. The apparatus of claim 2, further comprising a signal comparison module configured to compare the set of signal detection parameters to values within an error code signature table and to provide a matching error code index.

4. The apparatus of claim 3, further comprising an error message lookup module configured to use the error code index to access an error message lookup table and provide a corresponding set of error message parameters.

5. The apparatus of claim 1, further comprising an input module configured to receive an input command from an operator.

6. The input module of claim 5, further comprising input selectors configured to allow the operator to select a plurality of configuration settings of the apparatus comprising an electronic device type to facilitate detection, a language mode, an output mode, and identification of the audible error code.

7. The apparatus of claim 1, further comprising an updateable non-volatile memory.

8. The apparatus of claim 1, further comprising an error code signature table containing error code signatures for audible error codes corresponding to an electronic device.

9. The apparatus claim 1, further comprising an error message lookup table including a set of known error messages for an electronic device.

10. The apparatus of claim 1, further comprising an output indicator configured to convey a representation of the error message to an operator.

11. The apparatus of claim 10, wherein the output indicator is a visual screen capable of displaying text messages.

12. The apparatus of claim 10, wherein the output indicator is an audible signal generator.

13. The apparatus of claim 1, further comprising a communications port for connection to and interface with an external computerized device.

14. The apparatus of claim 1, further comprising a controller to process a communications signal between a set of internal modules.

15. The apparatus of claim 1, further comprising a signal receiver to receive the audible error code.

16. An apparatus for detection and identification of an audible error code, the apparatus comprising:
    a controller configured to process a communications signal between a set of internal modules;
    a signal detection module configured to detect and receive the audible error code when audibly communicated from an electronic device, wherein the signal detection module is not in electrical communication with the electronic device;
    an input module configured to allow an operator to select a plurality of configuration settings of the apparatus using an input selector;
    an updateable non-volatile memory containing an error code signature table and an error message lookup table;
    a signal conversion module configured to convert the received audible error code to a set of signal detection parameters using a fast Fourier transform;
    an output module configured to convey a representation of an error message to an operator via an output indicator, the error message comprising an audible voice and visual text providing real-time maintenance and equipment troubleshooting hyperlinks; and
    a communications port for connection to and interface with an external computerized device.

17. An audible error code detection and identification system, the system comprising:
    an electronic device having an audible error code generator capable of producing an audible error code; and
    an audible error code detection and identification apparatus not in electrical communication with the electronic device, configured to receive the audible error code when audibly communicated, convert the received audible error code to a set of signal detection parameters using a fast Fourier transform, compare the set of signal detection parameters to values within an error code signature table and to provide a matching error code index, use the error code index to access an error message lookup table and provide a corresponding set of error message parameters, and convey a corresponding error message to an operator, the error message operator, the error message comprising an audible voice and visual text providing real-time maintenance and equipment troubleshooting hyperlinks.

18. A method for detection and identification of an audible error code, the method comprising:
    receiving an audible error code when audibly communicated, wherein the audible error code encodes error data information for an electronic device, wherein the signal detection module is not in electrical communication with the electronic device;
    using the signal detection parameters to search an error code signature table and provide an error code index;
    using the error code index to search an error message lookup table and provide a set of error message parameters; and
    conveying an error message corresponding to the audible error code to an operator, the error message comprising an audible voice and visual text providing real-time maintenance and equipment troubleshooting hyperlinks.

19. The method of claim 18, further comprising selecting a plurality of configuration settings, including an electronic device type to facilitate detection, a language mode, an output mode, and identification of the audible error code.

20. The method of claim 18, further comprising converting the audible error code to a set of signal detection parameters.

21. The method of claim 19, further comprising using an error code index to search an error message lookup table and provide a set of error message parameters.

22. A method for detection and identification of an audible error code, the method comprising:
   selecting a plurality of configuration settings, including an electronic device type;
   receiving an audible error code when audibly communicated;
   converting the audible error code to a set of signal detection parameters;
   using the signal detection parameters to search an error code signature table and provide an error code index;
   using the error code index to search an error message lookup table and provide a set of error message parameters; and
   conveying a representation of an identified error condition to an operator via an output indicator, the representation comprising an audible voice and visual text providing real-time maintenance and equipment troubleshooting hyperlinks.

23. An apparatus for detection and identification of an audible error code, the apparatus comprising:
   means for selecting a plurality of configuration settings, including an electronic device type;
   means for receiving the audible error code when audibly communicated;
   means for converting the audible error code to a set of signal detection parameters;
   means for using the signal detection parameters to search an error code signature table and provide an error code index;
   means for using the error code index to access an error message lookup table and provide a set of error message parameters;
   means for conveying a representation of an identified error condition to an operator via an output indicator, the representation comprising an audible voice and visual text providing real-time maintenance and equipment troubleshooting hyperlinks;
   means for connecting to and interfacing with an external computerized device; and
   means for receiving a lookup table update signal.

* * * * *